(12) United States Patent
Yang et al.

(10) Patent No.: US 11,518,874 B2
(45) Date of Patent: Dec. 6, 2022

(54) THERMOPLASTIC RESIN COMPOSITION AND MOLDED PRODUCT MANUFACTURED THEREFROM

(71) Applicant: LOTTE ADVANCED MATERIALS CO., LTD., Yeosu-si (KR)

(72) Inventors: Cheon Seok Yang, Uiwang-si (KR); Seung Yong Bae, Uiwang-si (KR); Yoen Kyoung Kim, Uiwang-si (KR); Ju Sung Kim, Uiwang-si (KR); Kang Yeol Park, Uiwang-si (KR)

(73) Assignee: Lotte Advanced Materials Co., Ltd., Yeosu-si (KR)

( * ) Notice: Subject to any disclaimer, the term of this patent is extended or adjusted under 35 U.S.C. 154(b) by 374 days.

(21) Appl. No.: 16/628,060

(22) PCT Filed: Jun. 14, 2018

(86) PCT No.: PCT/KR2018/006705
§ 371 (c)(1),
(2) Date: Jan. 2, 2020

(87) PCT Pub. No.: WO2019/013458
PCT Pub. Date: Jan. 17, 2019

(65) Prior Publication Data
US 2021/0147671 A1 May 20, 2021

(30) Foreign Application Priority Data
Jul. 14, 2017 (KR) .................. 10-2017-0089399

(51) Int. Cl.
| C08L 51/04 | (2006.01) |
| C08L 55/02 | (2006.01) |
| C08L 25/12 | (2006.01) |
| C08K 3/22 | (2006.01) |
| C08K 3/32 | (2006.01) |
| C08K 9/02 | (2006.01) |

(52) U.S. Cl.
CPC .............. C08L 51/04 (2013.01); C08K 3/22 (2013.01); C08K 3/32 (2013.01); C08K 9/02 (2013.01); C08L 25/12 (2013.01); C08L 55/02 (2013.01); *C08K 2003/2296* (2013.01); *C08K 2003/321* (2013.01); *C08K 2201/003* (2013.01); *C08K 2201/006* (2013.01); *C08L 2203/30* (2013.01); *C08L 2207/04* (2013.01)

(58) Field of Classification Search
CPC .......... C08L 51/04; C08L 55/02; C08L 25/12; C08L 2203/30; C08L 2207/04; C08K 3/22; C08K 3/32; C08K 2201/006; C08K 2003/2296; C08K 2003/321; C08K 2201/003; C08K 9/02
See application file for complete search history.

(56) References Cited

U.S. PATENT DOCUMENTS

| 6,663,877 | B1 | 12/2003 | Appleton et al. |
| 9,534,109 | B2 * | 1/2017 | Hoerold .............. C08K 5/0066 |
| 9,790,364 | B2 | 10/2017 | Lee et al. |
| 2014/0275368 | A1 | 9/2014 | He et al. |
| 2017/0044364 | A1 * | 2/2017 | Lee ........................ C08K 5/523 |
| 2018/0002521 | A1 | 1/2018 | Jang et al. |

FOREIGN PATENT DOCUMENTS

| CN | 102786765 A | 11/2012 |
| CN | 103140547 A | 6/2013 |
| CN | 105189650 A | 12/2015 |
| CN | 106147213 A | 11/2016 |
| CN | 106433064 A | 2/2017 |
| ES | 420841 A1 | 4/1976 |
| JP | 11-35787 A | 2/1999 |
| JP | 2013-531117 A | 8/2013 |
| KR | 10-2012-0059668 A | 6/2012 |
| KR | 10-2013-0071156 A | 6/2013 |
| KR | 10-2015-0131104 A | 11/2015 |
| KR | 10-2017-0020668 A | 2/2017 |
| KR | 10-2017-0069456 A | 6/2017 |
| WO | 2005/037924 A1 | 4/2005 |
| WO | 2017/099419 A | 6/2017 |
| WO | 2019/013458 A1 | 1/2019 |

OTHER PUBLICATIONS

International Search Report in counterpart International Application No. PCT/KR2018/006705 dated Sep. 21, 2018, pp. 1-4.
Office Action in counterpart Chinese Application No. 201880047012.6 dated Dec. 27, 2021, pp. 1-6.
Sungho Lee et al: "Preparation of Antibacterial ZnO—CaO—P2O5—Nb2O5 Invert Glasses", Materials Transactions, pp. 2072-2076 (Dec. 31, 2015).
Office Action in counterpart Japanese Patent Application No. 2020-501150 dated Mar. 1, 2022, pp. 1-4.
Yamamoto et al., "Influence of Powder Characteristic of ZnO on Antibacterial Activity: Effect of Specific Surface Area", Journal of the Ceramic Society of Japan, 106[10], pp. 1007-1011 [With English Abstract].

\* cited by examiner

*Primary Examiner* — Robert D Harlan
(74) *Attorney, Agent, or Firm* — Additon, Pendleton & Witherspoon, P.A.

(57) ABSTRACT

A thermoplastic resin composition of the present invention is characterized by comprising: a thermoplastic resin containing a rubber-modified vinyl-based graft copolymer and an aromatic vinyl-based copolymer resin; zinc oxide; zinc phosphate; a surface-coated zinc oxide, of which a portion or the entirety of a surface is coated with zinc phosphate. The thermoplastic resin composition has excellent acid resistance and antibacterial properties.

10 Claims, 1 Drawing Sheet

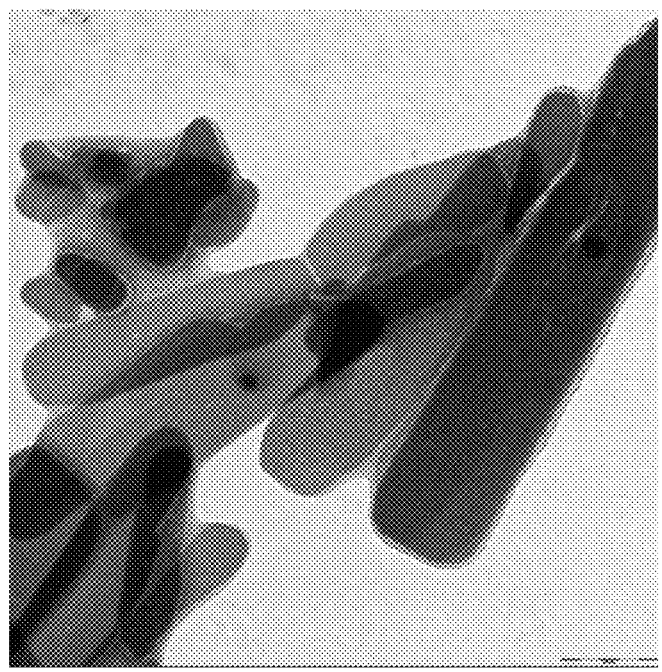

THERMOPLASTIC RESIN COMPOSITION AND MOLDED PRODUCT MANUFACTURED THEREFROM

CROSS-REFERENCE TO RELATED APPLICATIONS

This application claims priority to and the benefit of International Application No. PCT/KR2018/006705, filed Jun. 14, 2018, which published as WO 2019/013458 on Jan. 17, 2019, and Korean Patent Application No. 10-2017-0089399, filed in the Korean Intellectual Property Office on Jul. 14, 2017, the entire disclosure of each of which is incorporated herein by reference.

TECHNICAL FIELD

The present invention relates to a thermoplastic resin composition and a molded product manufactured using the same. More particularly, the present invention relates to a thermoplastic resin composition having good properties in terms of acid resistance, antibacterial properties and the like, and a molded product manufactured using the same.

BACKGROUND ART

Rubber-modified aromatic vinyl copolymer resins such as acrylonitrile-butadiene-styrene copolymer resins (ABS resins) have good properties in terms of mechanical properties, processability, and appearance characteristics and thus are widely used as interior/exterior materials for electrical/electronic products, interior/exterior materials for automobiles, and exterior materials for construction.

In addition, a thermoplastic resin composition including such a rubber-modified aromatic vinyl copolymer resin and a molded product thereof need to have antibacterial properties when used in applications where direct or indirect physical contact occurs. In order to prepare such an antibacterial thermoplastic resin composition, it is necessary to add an antibacterial agent. As the antibacterial agent, zinc oxide is commonly used.

However, typical antibacterial agents such as zinc oxide have the disadvantage that they exhibit reduced antibacterial properties under acidic conditions and thus are useable only under limited conditions.

Therefore, there is a need for a thermoplastic resin composition having good properties in terms of both acid resistance and antibacterial properties.

The background technique of the present invention is disclosed in Korean Patent No. 10-1452020 and the like.

DISCLOSURE

Technical Problem

It is one aspect of the present invention to provide a thermoplastic resin composition which has good properties in terms of acid resistance, antibacterial properties, and balance therebetween.

It is another aspect of the present invention to provide a molded product formed of the thermoplastic resin composition set forth above.

The above and other aspects of the present invention will become apparent from the detailed description of the following embodiments.

Technical Solution

One aspect of the present invention relates to a thermoplastic resin composition. The thermoplastic resin composition includes: a thermoplastic resin including a rubber-modified vinyl graft copolymer and an aromatic vinyl copolymer resin; zinc oxide; zinc phosphate; and surface-coated zinc oxide, a surface of which is partially or entirely coated with zinc phosphate.

In one embodiment, the thermoplastic resin composition may include:
about 100 parts by weight of the thermoplastic resin including about 15 wt % to about 50 wt % of the rubber-modified vinyl graft copolymer and about 50 wt % to about 85 wt % of the aromatic vinyl copolymer resin; about 0.1 parts by weight to about 30 parts by weight of the zinc oxide; about 0.1 parts by weight to about 30 parts by weight of the zinc phosphate; and about 0.01 parts by weight to about 3 parts by weight of the surface-coated zinc oxide.

In one embodiment, the rubber-modified vinyl graft copolymer may be prepared by graft-polymerization of a monomer mixture including an aromatic vinyl monomer and a vinyl cyanide monomer to a rubber polymer.

In one embodiment, the aromatic vinyl copolymer resin may be a polymer of an aromatic vinyl monomer and a monomer copolymerizable with the aromatic vinyl monomer.

In one embodiment, the zinc oxide may have an average particle diameter of about 0.5 μm to about 3 μm and a BET specific surface area of about 1 $m^2/g$ to about 10 $m^2/g$.

In one embodiment, the zinc phosphate and the surface-coated zinc oxide may be prepared by reacting the zinc oxide with a phosphoric acid solution.

In one embodiment, the zinc oxide and the zinc phosphate may be present in a weight ratio (zinc oxide:zinc phosphate) of about 1:0.1 to about 1:5.

In one embodiment, the zinc phosphate and the surface-coated zinc oxide may be present in a weight ratio (zinc phosphate:surface-coated zinc oxide) of about 1:0.01 to about 1:0.5.

In one embodiment, the thermoplastic resin composition may have an antibacterial activity of about 2 to about 7 against each of *Staphylococcus aureus* and *Escherichia coli*, as measured on 5 cm×5 cm specimens after dipping in a 3% acetic acid solution for 16 hours, inoculation with *Staphylococcus aureus* and *Escherichia coli*, respectively, and culturing under conditions of 35° C. and 90% RH for 24 hours in accordance with JIS Z 2801.

Another aspect of the present invention relates to a method of preparing a thermoplastic resin composition. The method includes: preparing a mixture of zinc phosphate and surface-coated zinc oxide, a surface of which is partially or entirely coated with zinc phosphate by reacting zinc oxide with phosphoric acid; and blending the mixture with zinc oxide and a thermoplastic resin including a rubber-modified vinyl graft copolymer and an aromatic vinyl copolymer resin.

A further aspect of the present invention relates to a molded product. The molded product is formed of the thermoplastic resin composition set forth above.

Advantageous Effects

The present invention provides a thermoplastic resin composition which has good properties in terms of acid resistance, antibacterial properties, and balance therebetween, and a molded product formed of the same.

DESCRIPTION OF DRAWINGS

FIG. 1 is a transmission electron microscopy (TEM) image of a surface-coated zinc oxide prepared according to one embodiment of the present invention.

BEST MODE

Hereinafter, embodiments of the present invention will be described in detail.

A thermoplastic resin composition according to the present invention includes: (A) a thermoplastic resin including (A1) a rubber-modified vinyl graft copolymer and (A2) an aromatic vinyl copolymer resin; (B) zinc oxide; (C) zinc phosphate; and (D) a surface-coated zinc oxide, a surface of which is partially or entirely coated with zinc phosphate.

(A) Thermoplastic Resin

The thermoplastic resin according to the present invention may be a rubber-modified vinyl copolymer resin including the rubber-modified vinyl graft copolymer (A1) and the aromatic vinyl copolymer resin (A2).

(A1) Rubber-Modified Vinyl Graft Copolymer

The rubber-modified vinyl graft copolymer according to one embodiment of the present invention serves to improve impact resistance and moldability of the thermoplastic resin composition, and may be prepared by graft-polymerization of a monomer mixture including an aromatic vinyl monomer and a vinyl cyanide monomer to a rubber polymer. The monomer mixture may further include a monomer for imparting processability and heat resistance, as needed. Here, the polymerization may be carried out by any suitable polymerization method known in the art, such as emulsion polymerization and suspension polymerization. In addition, the rubber-modified vinyl graft copolymer may have a core (the rubber polymer)-shell (a copolymer of the monomer mixture) structure, without being limited thereto.

In some embodiments, the rubber polymer may include: diene rubbers such as polybutadiene, poly(styrene-butadiene), and poly(acrylonitrile-butadiene); saturated rubbers obtained by adding hydrogen to the diene rubbers; acrylic rubbers; isoprene rubbers; and ethylene-propylene-diene terpolymer (EPDM). These may be used alone or as a mixture thereof. For example, the rubber polymer may be a butadiene rubber.

In some embodiments, the rubber polymer (rubber particles) may have an average (z-average) particle diameter of about 0.05 µm to about 6 µm, for example, about 0.15 µm to about 4 µm, specifically about 0.25 µm to about 3.5 µm. Within this range, the thermoplastic resin composition can have good properties in terms of impact resistance and appearance characteristics.

In some embodiments, the rubber polymer may be present in an amount of about 20 wt % to about 70 wt %, for example, about 30 wt % to about 60 wt %, based on the total weight of the rubber-modified vinyl graft copolymer, and the monomer mixture (including the aromatic vinyl monomer and the vinyl cyanide monomer) may be present in an amount of about 30 wt % to about 80 wt %, for example, about 40 wt % to about 70 wt %, based on the total weight of the rubber-modified vinyl graft copolymer. Within this range, the thermoplastic resin composition can have good properties in terms of impact resistance and appearance characteristics.

In some embodiments, the aromatic vinyl monomer is graft-copolymerizable with the rubber copolymer, and may include, for example, styrene, α-methyl styrene, β-methyl styrene, p-methyl styrene, p-t-butyl styrene, ethyl styrene, vinylxylene, monochlorostyrene, dichlorostyrene, dibromostyrene, and vinyl naphthalene. These may be used alone or as a mixture thereof. The aromatic vinyl monomer may be present in an amount of about 10 wt % to about 90 wt %, for example, about 40 wt % to about 90 wt %, based on the total weight of the monomer mixture. Within this range, the thermoplastic resin composition can have good properties in terms of processability and impact resistance.

In some embodiments, the vinyl cyanide monomer is copolymerizable with the aromatic vinyl monomer, and may include, for example, acrylonitrile, methacrylonitrile, ethacrylonitrile, phenylacrylonitrile, α-chloroacrylonitrile, and fumaronitrile. These may be used alone or as a mixture thereof. For example, the vinyl cyanide monomer may be acrylonitrile or methacrylonitrile. The vinyl cyanide monomer may be present in an amount of about 10 wt % to about 90 wt %, for example, about 10 wt % to about 60 wt %, based on the total weight of the monomer mixture. Within this range, the thermoplastic resin composition can have good chemical resistance and mechanical properties.

In some embodiments, the monomer for imparting processability and heat resistance may include, for example, (meth)acrylic acid, maleic anhydride, and N-substituted maleimide, without being limited thereto. The monomer for imparting processability and heat resistance may be present in an amount of about 15 wt % or less, for example, about 0.1 wt % to about 10 wt %, based on the total weight of the monomer mixture. Within this range, the monomer for imparting processability and heat resistance can impart processability and heat resistance to the thermoplastic resin composition without deterioration in other properties.

In some embodiments, the rubber-modified vinyl graft copolymer may be, for example, an acrylonitrile-butadiene-styrene graft copolymer (g-ABS) obtained by grafting a styrene monomer as the aromatic vinyl compound and an acrylonitrile monomer as the vinyl cyanide compound to a butadiene rubber polymer.

In some embodiments, the rubber-modified vinyl graft copolymer may be present in an amount of about 15 wt % to about 50 wt %, for example, about 20 wt % to about 45 wt %, based on the total weight of the thermoplastic resin (including the rubber-modified vinyl graft copolymer and the aromatic vinyl copolymer resin). Within this range, the thermoplastic resin composition can have good properties in terms of impact resistance, flowability (moldability), appearance, and balance therebetween.

(A2) Aromatic Vinyl Copolymer Resin

The aromatic vinyl copolymer resin according to one embodiment of the present invention may be an aromatic vinyl copolymer resin used in typical rubber-modified vinyl copolymer resins. For example, the aromatic vinyl copolymer resin may be a polymer of a monomer mixture including an aromatic vinyl monomer and a monomer copolymerizable with the aromatic vinyl monomer, such as a vinyl cyanide monomer.

In some embodiments, the aromatic vinyl copolymer resin may be prepared by mixing the aromatic vinyl monomer with the monomer copolymerizable with the aromatic vinyl monomer, followed by polymerization of the mixture. Here, the polymerization may be performed by any suitable polymerization method known in the art, such as emulsion polymerization, suspension polymerization, and bulk polymerization.

In some embodiments, the aromatic vinyl monomer may include styrene, α-methylstyrene, β-methylstyrene, p-methyl styrene, p-t-butylstyrene, ethyl styrene, vinylxylene, monochlorostyrene, dichlorostyrene, dibromostyrene, and vinyl naphthalene. These may be used alone or as a mixture thereof. The aromatic vinyl monomer may be present in an amount of about 20 wt % to about 90 wt %, for example, about 30 wt % to about 80 wt %, based on the total weight of the aromatic vinyl copolymer resin. Within this range, the thermoplastic resin composition can have good properties in terms of impact resistance and flowability.

In some embodiments, the monomer copolymerizable with the aromatic vinyl monomer may include, for example, vinyl cyanide monomers such as acrylonitrile, methacrylonitrile, ethacrylonitrile, phenylacrylonitrile, α-chloroacrylonitrile, and fumaronitrile. These may be used alone or as a mixture thereof. The monomer copolymerizable with the aromatic vinyl monomer may be present in an amount of about 10 wt % to about 80 wt %, for example, about 20 wt % to about 70 wt %, based on the total weight of the aromatic vinyl copolymer resin. Within this range, the thermoplastic resin composition can have good properties in terms of impact resistance and flowability.

In some embodiments the aromatic vinyl copolymer resin may have a weight average molecular weight (Mw) of about 10,000 g/mol to about 300,000 g/mol, for example, about 15,000 g/mol to about 150,000 g/mol, as measured by gel permeation chromatography (GPC). Within this range, the thermoplastic resin composition can have good properties in terms of mechanical strength and moldability.

In some embodiments, the aromatic vinyl copolymer resin may be present in an amount of about 50 wt % to about 85 wt %, for example about 55 wt % to about 80 wt %, based on the total weight of the thermoplastic resin. Within this range, the thermoplastic resin composition can have good properties in terms of impact resistance and flowability (moldability).

(B) Zinc Oxide

The zinc oxide according to one embodiment of the present invention serves to improve antibacterial properties and weather resistance of the thermoplastic resin composition, and may be zinc oxide typically used as an antibacterial agent.

In some embodiments, the zinc oxide may have an average particle diameter of about 0.5 μm to about 3 μm, for example, about 1 μm to about 3 μm, as measured using a particle size analyzer, a BET specific surface area of about 1 m²/g to about 10 m²/g, for example, about 1 m²/g to about 7 m²/g, and a purity of about 99% or more. Within these ranges of average particle size, BET specific surface area, and purity, the thermoplastic resin composition can have good properties in terms of antibacterial properties and weather resistance.

In some embodiments, the zinc oxide may have a peak intensity ratio (B/A) of about 0 to about 1, for example, about 0.01 to about 1, specifically about 0.1 to about 1, where A indicates a peak in the wavelength range of 370 nm to 390 nm and B indicates a peak in the wavelength range of 450 nm to 600 nm in photoluminescence measurement. Within this range, the thermoplastic resin composition can have further improved properties in terms of weather resistance and antibacterial properties.

In some embodiments, the zinc oxide may have a peak position degree (2θ) in the range of about 35° to about 37° and a crystallite size of about 1,000 Å to about 2,000 Å, for example, about 1,200 Å to about 1,800 Å, in X-ray diffraction (XRD) analysis, as calculated by Scherrer's Equation (Equation 1) with reference to a measured FWHM value (full width at half maximum of a diffraction peak). Within this range, the thermoplastic resin composition can have good properties in terms of initial color, weather resistance, and antibacterial properties.

$$\text{Crystallite size}(D) = \frac{K\lambda}{\beta\cos\theta} \quad \text{[Equation 1]}$$

In Equation 1, K is a shape factor, λ is an X-ray wavelength, β is an FWHM value (degree) of an X-ray diffraction peak, and θ is a peak position degree.

In some embodiments, the zinc oxide may be prepared by melting metallic zinc in a reactor, heating the molten zinc to about 850° C. to about 1,000° C., for example, about 900° C. to about 950° C., to vaporize the molten zinc, injecting oxygen gas into the reactor, cooling the reactor to about 20° C. to about 30° C., heating the reactor to about 400° C. to about 900° C., for example, about 500° C. to about 800° C., specifically about 700° C. to about 800° C., for about 30 minutes to about 150 minutes, for example, 60 minutes to about 120 minutes, while injecting nitrogen/hydrogen gas into the reactor, as needed, and cooling the reactor to room temperature (about 20° C. to about 30° C.).

In some embodiments, the zinc oxide may be present in an amount of about 0.1 parts by weight to about 30 parts by weight, for example, about 1 part by weight to about 10 parts by weight, specifically about 2 parts by weight to about 5 parts by weight, relative to about 100 parts by weight of the thermoplastic resin. Within this range, the thermoplastic resin composition can have good properties in terms of antibacterial properties, impact resistance, and appearance characteristics.

(C) Zinc Phosphate

The zinc phosphate according to one embodiment of the present invention serves to improve acid resistance of the thermoplastic resin composition, and may include zinc phosphate typically used in the art. For example, the zinc phosphate may be prepared by reacting zinc oxide with phosphoric acid or may be a commercially available zinc phosphate product.

In some embodiments, the zinc phosphate may have an average particle diameter of about 0.5 μm to about 3 μm, for example, about 1 μm to about 3 μm, and a purity of 99% or more. Within these ranges of average particle diameter and purity, the thermoplastic resin composition can have good acid resistance.

In some embodiments, the zinc phosphate may be present in an amount of about 0.1 parts by weight to about 30 parts by weight, for example, about 0.5 parts by weight to about 10 parts by weight, specifically about 1 part by weight to about 5 parts by weight, relative to about 100 parts by weight of the thermoplastic resin. Within this range, the thermoplastic resin composition can have good properties in terms of acid resistance, impact resistance, and appearance characteristics.

In some embodiments, the zinc oxide (B) and the zinc phosphate (C) may be present in a weight ratio (B:C) of about 1:0.1 to about 1:5, for example, about 1:0.5 to about 1:2. Within this range, the thermoplastic resin composition can have further improved properties in terms of acid resistance, impact resistance, and appearance characteristics.

(D) Surface-Coated Zinc Oxide

The surface-coated zinc oxide according to one embodiment of the present invention serves to improve acid resistance and antibacterial properties of the thermoplastic resin composition in conjunction with the zinc oxide and the zinc phosphate, and has a zinc phosphate coating layer formed on the entirety or part of the zinc oxide.

In some embodiments, the zinc phosphate coating layer may cover about 50% or more of the surface area of the zinc oxide and may have a thickness of about 1 nm to about 50 nm. The surface-coated zinc oxide may have a core (zinc oxide)-shell (zinc phosphate) structure wherein the zinc phosphate coating layer, which is a reaction product of phosphoric acid and the zinc oxide, is formed on the surface of the zinc oxide.

In some embodiments, the surface-coated zinc oxide may be prepared along with the zinc phosphate by placing zinc oxide in an organic solvent such as acetone, followed by stirring, and adding about 7 parts by weight to about 70 parts by weight of phosphoric acid and about 1 part by weight to about 5 parts by weight of water, relative to about 100 parts by weight of the zinc oxide, followed by reaction for 30 seconds to about 10 minutes. The presence, weight ratio, and the like of the prepared zinc phosphate and surface-coated zinc oxide may be ascertained by TGA analysis, mass spectrometry, and the like.

In some embodiments, the content of zinc phosphate in the surface-coated zinc oxide may range from about 0.01 wt % to about 5 wt %, for example, from about 0.05 wt % to about 1 wt %, based on the total weight of the surface-coated zinc oxide. Within this range, the thermoplastic resin composition can have good acid resistance and antibacterial properties.

In some embodiments, the surface-coated zinc oxide may be present in an amount of about 0.01 parts by weight to about 3 parts by weight, for example, about 0.02 parts by weight to about 1 part by weight, specifically about 0.05 parts by weight to about 0.5 parts by weight, relative to 100 parts by weight of the thermoplastic resin. Within this range, the thermoplastic resin composition can have good properties in terms of acid resistance, antibacterial properties, impact resistance, and appearance characteristics.

In some embodiments, the zinc phosphate (C) and the surface-coated zinc oxide (D) may be present in a weight ratio (C:D) of about 1:0.01 to about 1:0.5, for example, about 1:0.015 to about 1:0.1. Within this range, the thermoplastic resin composition can have further improved properties in terms of acid resistance and antibacterial properties.

The thermoplastic resin composition according to the present invention may further include additives used in typical thermoplastic resin compositions. Examples of the additives may include flame retardants, fillers, antioxidants, anti-dripping agents, lubricants, release agents, nucleating agents, antistatic agents, pigments, dyes, and combinations thereof, without being limited thereto. The additive may be present in an amount of about 0.001 parts by weight to about 40 parts by weight, for example, about 0.1 parts by weight to about 10 parts by weight, relative to about 100 parts by weight of the thermoplastic resin.

The thermoplastic resin composition according to the present invention may be prepared by simply mixing the aforementioned components, or by preparing a mixture of zinc phosphate and a surface-coated zinc oxide, a surface of which is partially or entirely coated with zinc phosphate by reacting zinc oxide with phosphoric acid, followed by blending of the mixture with zinc oxide and a thermoplastic resin including a rubber-modified vinyl graft copolymer and an aromatic vinyl copolymer resin.

In some embodiments, in preparation of the thermoplastic resin composition, the zinc phosphate and/or the surface-coated zinc oxide may further added to the mixture.

In some embodiments, the thermoplastic resin composition may be prepared in pellet form by melt extrusion in a typical twin-screw extruder at about 200° C. to about 280° C., for example, about 220° C. to about 250° C.

In some embodiments, the thermoplastic resin composition may have an antibacterial activity of about 2 to about 7, for example, about 3 to about 6.3, against each of *Staphylococcus aureus* and *Escherichia coli*, as measured on 5 cm×5 cm specimens after inoculation with *Staphylococcus aureus* and *Escherichia coli*, respectively, and culturing under conditions of 35° C. and 90% RH for 24 hours in accordance with JIS Z 2801.

In some embodiments, the thermoplastic resin composition may have an antibacterial activity of about 2 to about 7, for example, about 2.1 to about 6, against each of *Staphylococcus aureus* and *Escherichia coli*, as measured on 5 cm×5 cm specimens after dipping in a 3% acetic acid solution for 16 hours, inoculation with *Staphylococcus aureus* and *Escherichia coli*, respectively, and culturing under conditions of 35° C. and 90% RH for 24 hours in accordance with JIS Z 2801.

A molded product according to the present invention may be formed of the thermoplastic resin composition set forth above. The thermoplastic resin composition may be prepared in pellet form. The prepared pellets may be produced into various molded products (articles) by various molding methods such as injection molding, extrusion, vacuum molding, and casting. Such molding methods are well known to those skilled in the art. The molded product has good properties in terms of acid resistance, antibacterial properties, impact resistance, appearance characteristics, moldability, and balance therebetween, and thus is useful as interior/exterior materials for electrical/electronic products useable under acidic conditions, interior/exterior materials for automobiles, and exterior materials for construction.

MODE FOR INVENTION

Next, the present invention will be described in more detail with reference to some examples. It should be understood that these examples are provided for illustration only and are not to be in any way construed as limiting the present invention.

Example

Details of components used in Examples and Comparative Examples are as follows:

(A) Thermoplastic resin (A1) Rubber-Modified Aromatic Vinyl Graft Copolymer

A g-ABS copolymer obtained by graft-copolymerization of 55 wt % of styrene and acrylonitrile (weight ratio: 75/25) to 45 wt % of butadiene rubber (Z-average particle size: 310 nm) was used.

(A2) Aromatic Vinyl Copolymer Resin

A SAN resin (weight average molecular weight: 130,000 g/mol) obtained by polymerization of 71 wt % of styrene with 29 wt % of acrylonitrile was used.

(B) Zinc Oxide

Zinc oxide having an average particle diameter of 1.2 μm, a BET surface area of 4 m$^2$/g, and a purity of 99% was used.

(C1) Zinc Phosphate and (D) Surface-Coated Zinc Oxide

The zinc oxide was placed in acetone (zinc oxide: 100 parts by weight, acetone: 1,000 parts by weight), followed by stirring, and then 70 parts by weight of phosphoric acid and 1 part by weight of water, relative to 100 parts by weight of the zinc oxide, were added to the solution, followed by reaction for 3 minutes, thereby preparing zinc phosphate (C1) and surface-coated zinc oxide (D) (weight ratio: 1:0.03). FIG. 1 is a transmission electron microscopy (TEM) image of the prepared surface-coated zinc oxide (D). In FIG. 1, the dark-colored central portion (core) indicates zinc oxide and the thin light-colored portion (shell) surrounding the zinc oxide indicates a zinc phosphate coating layer.

(C2) Zinc Phosphate

A commercially available zinc phosphate product (zinc phosphate tetrahydrate, manufacturer: SBC, product name: zinc phosphate) was used.

Property Evaluation (1) Average particle diameter (unit: μm): Average particle diameter (volume average) was measured using a particle size analyzer (Laser Diffraction Particle Size Analyzer LS 13 320, Beckman Coulter Co., Ltd.).

(2) BET surface area (unit: $m^2/g$): BET surface area was measured by a nitrogen gas adsorption method using a BET analyzer (Surface Area and Porosity Analyzer ASAP 2020, Micromeritics Co., Ltd.).

(3) Purity (unit: %): Purity was measured by thermogravimetric analysis (TGA) based on the weight of remaining material at 800° C.

(4) Component content of surface-coated zinc oxide (D): Component content in the surface-coated zinc oxide (D) was measured by a content analysis method using a TGA (thermogravimetric analyzer). In thermogravimetric analysis, zinc oxide does not decompose up to 850° C., whereas zinc phosphate decomposes at 200° C. or more. Therefore, the content of zinc phosphate in the surface-coated zinc oxide may be measured by heating the surface-coated zinc oxide to 200° C. or more in the TGA, followed by subtracting the weight of the residue after weight reduction from the initial weight of the surface-coated zinc oxide. Specifically, the component content of the surface-coated zinc oxide (D) was measured at a heating rate of 20° C./min while injecting nitrogen gas and air in the temperature range of 30° C. to 850° C. using a TA Q5000 model (Mettler Toledo Co., Ltd.).

Examples 1 to 2 and Comparative Examples 1 to 3

The aforementioned components were mixed in amounts as listed in Table 1, followed by extrusion at 230° C., thereby preparing a thermoplastic resin composition in pellet form. Here, extrusion was performed using a twin-screw extruder (L/D: 36, Φ: 45 mm). The prepared pellets were dried at 80° C. for 2 hours or more and then subjected to injection molding using a 6 oz. injection machine (molding temperature: 230° C., mold temperature: 60° C.), thereby preparing a specimen. The prepared specimen was evaluated as to the following properties. Results are shown in Table 1.

Property Evaluation (1) Antibacterial activity: Antibacterial activity was measured on 5 cm×5 cm specimens after inoculation with *Staphylococcus aureus* and *Escherichia coli*, respectively, and culturing under conditions of 35° C. and 90% RH for 24 hours in accordance with JIS Z 2801.

(2) Acid resistance: Antibacterial activity after acid treatment was measured on 5 cm×5 cm specimens after dipping in a 3% acetic acid solution, inoculation with *Staphylococcus aureus* and *Escherichia coli*, respectively, and culturing under conditions of 35° C. and 90% RH for 24 hours in accordance with JIS Z 2801.

(3) Notched Izod impact strength (unit: kgf·cm/cm): Notched Izod impact strength was measured on a ⅛" thick Izod specimen in accordance with ASTM D256.

TABLE 1

|  |  | Example | | Comparative Example | | |
|---|---|---|---|---|---|---|
|  |  | 1 | 2 | 1 | 2 | 3 |
| (A) (wt %) | (A1) | 28 | 28 | 28 | 28 | 28 |
|  | (A2) | 72 | 72 | 72 | 72 | 72 |
|  | (B) (parts by weight) | 2 | 2 | 2 | — | 2 |
| (C) (parts by weight) | (C1) | 2 | 2 | — | — | — |
|  | (C2) | — | 2 | — | 2 | 2 |
|  | (D) (parts by weight) | 0.06 | 0.06 | — | — | — |
|  | (B):(C) (weight ratio) | 1:1 | 1:2 | — | — | 1:1 |
|  | (C):(D) (weight ratio) | 1:0.03 | 1:0.015 | — | — | — |
| Antibacterial activity | *Escherichia coli* | 4.6 | 4.6 | 4.6 | 2.9 | 4.6 |
|  | *Staphylococcus aureus* | 6.3 | 6.3 | 6.3 | 3.3 | 6.3 |
| Antibacterial activity after acid treatment | *Escherichia coli* | 4.6 | 4.6 | 0.2 | 1.4 | 1.7 |
|  | *Staphylococcus aureus* | 2.6 | 3.1 | 0.5 | 0 | 0.1 |
| Notched Izod impact strength | | 19.1 | 18.7 | 19.2 | 18.6 | 18.2 |

* Parts by weight relative to 100 parts by weight of the thermoplastic resin (A)

From the results, it can be seen that the thermoplastic resin composition according to the present invention exhibited good properties in terms of acid resistance and antibacterial properties.

On the contrary, the thermoplastic resin composition of Comparative Example 1, free from the zinc phosphate (C) and the surface-coated zinc oxide (D), exhibited poor acid resistance (antibacterial activity after acid treatment), and the thermoplastic resin composition of Comparative Example 2, free from the zinc oxide (B) and the surface-coated zinc oxide (D), exhibited poor properties in terms of antibacterial properties and acid resistance. In addition, the thermoplastic resin composition of Comparative Example 3, free from the surface-coated zinc oxide (D), exhibited poor properties in terms of antimicrobial activity after acid treatment and impact resistance.

It should be understood that various modifications, changes, alterations, and equivalent embodiments can be made by those skilled in the art without departing from the spirit and scope of the invention.

The invention claimed is:

1. A thermoplastic resin composition comprising:
   (A) a thermoplastic resin comprising (A1) a rubber-modified vinyl graft copolymer and (A2) an aromatic vinyl copolymer resin;
   (B) zinc oxide;

(C) zinc phosphate; and (D) surface-coated zinc oxide that is not the same as the zinc oxide (B), a surface of which is partially or entirely coated with zinc phosphate, wherein the thermoplastic resin composition has an antibacterial activity of about 2 to about 7 against *Staphylococcus aureus*, as measured on 5 cm×5 cm specimens after dipping in a 3% acetic acid solution for 16 hours, inoculation with *Staphylococcus aureus*, and culturing under conditions of 35° C. and 90% RH for 24 hours in accordance with JIS Z 2801; and wherein the thermoplastic resin composition has an antibacterial activity of about 2 to about 7 against *Escherichia coli*, as measured on 5 cm×5 cm specimens after dipping in a 3% acetic acid solution for 16 hours, inoculation with *Escherichia coli*, and culturing under conditions of 35° C. and 90% RH for 24 hours in accordance with JIS Z 2801.

2. The thermoplastic resin composition according to claim 1, comprising:

about 100 parts by weight of the thermoplastic resin (A) comprising about 15 wt % to about 50 wt % of the rubber-modified vinyl graft copolymer (A1) and about 50 wt % to about 85 wt % of the aromatic vinyl copolymer resin (A2);

about 0.1 parts by weight to about 30 parts by weight of the zinc oxide (B);

about 0.1 parts by weight to about 30 parts by weight of the zinc phosphate (C); and about 0.01 parts by weight to about 3 parts by weight of the surface-coated zinc oxide (D).

3. The thermoplastic resin composition according to claim 1, wherein the rubber-modified vinyl graft copolymer (A1) is prepared by graft-polymerization of a monomer mixture comprising an aromatic vinyl monomer and a vinyl cyanide monomer to a rubber polymer.

4. The thermoplastic resin composition according to claim 1, wherein the aromatic vinyl copolymer resin (A2) is a polymer of an aromatic vinyl monomer and a monomer copolymerizable with the aromatic vinyl monomer.

5. The thermoplastic resin composition according to claim 1, wherein the zinc oxide (B) has an average particle diameter of about 0.5 μm to about 3 μm and a BET specific surface area of about 1 m2/g to about 10 m2/g.

6. The thermoplastic resin composition according to claim 1, wherein the zinc phosphate (C) and the surface-coated zinc oxide (D) are prepared by reacting the zinc oxide with a phosphoric acid solution.

7. The thermoplastic resin composition according to claim 1, wherein the zinc oxide (B) and the zinc phosphate (C) are present in a weight ratio (B:C) of about 1:0.1 to about 1:5.

8. The thermoplastic resin composition according to claim 1, wherein the zinc phosphate (C) and the surface-coated zinc oxide (D) are present in a weight ratio (C:D) of about 1:0.01 to about 1:0.5.

9. A method of preparing a thermoplastic resin composition, comprising:

preparing a mixture of zinc phosphate and surface-coated zinc oxide, a surface of which is partially or entirely coated with zinc phosphate by reacting zinc oxide with phosphoric acid; and blending the mixture with zinc oxide that is not the same as the surface-coated zinc oxide and a thermoplastic resin comprising a rubber-modified vinyl graft copolymer and an aromatic vinyl copolymer resin to provide a thermoplastic resin composition having an antibacterial activity of about 2 to about 7 against *Staphylococcus aureus*, as measured on 5 cm×5 cm specimens after dipping in a 3% acetic acid solution for 16 hours, inoculation with *Staphylococcus aureus*, and culturing under conditions of 35° C. and 90% RH for 24 hours in accordance with JIS Z 2801 and an antibacterial activity of about 2 to about 7 against *Escherichia coli*, as measured on 5 cm×5 cm specimens after dipping in a 3% acetic acid solution for 16 hours, inoculation with *Escherichia coli*, and culturing under conditions of 35° C. and 90% RH for 24 hours in accordance with JIS Z 2801.

10. A molded product formed of the thermoplastic resin composition according to claim 1.

\* \* \* \* \*